United States Patent
Xu et al.

(10) Patent No.: US 9,888,403 B2
(45) Date of Patent: Feb. 6, 2018

(54) METHOD AND APPARATUS FOR SUPPORTING MINIMIZATION OF DRIVE TESTS FOR RADIO ACCESS NETWORK SHARING IN WIRELESS COMMUNICATION SYSTEM

(71) Applicant: LG Electronics Inc., Seoul (KR)

(72) Inventors: Jian Xu, Seoul (KR); Sunghoon Jung, Seoul (KR); Kyungmin Park, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/109,027

(22) PCT Filed: Jan. 28, 2015

(86) PCT No.: PCT/KR2015/000876
§ 371 (c)(1),
(2) Date: Jun. 29, 2016

(87) PCT Pub. No.: WO2015/115782
PCT Pub. Date: Aug. 6, 2015

(65) Prior Publication Data
US 2016/0323768 A1 Nov. 3, 2016

Related U.S. Application Data

(60) Provisional application No. 61/987,506, filed on May 2, 2014, provisional application No. 61/933,313, filed on Jan. 30, 2014.

(51) Int. Cl.
*H04W 24/00* (2009.01)
*H04W 24/10* (2009.01)

(52) U.S. Cl.
CPC .................................. *H04W 24/10* (2013.01)

(58) Field of Classification Search
CPC ...................................................... H04W 24/10
See application file for complete search history.

(56) References Cited

U.S. PATENT DOCUMENTS

| | | |
|---|---|---|
| 2012/0208503 A1 | 8/2012 | Johansson et al. |
| 2013/0184026 A1 | 7/2013 | Fu et al. |

(Continued)

FOREIGN PATENT DOCUMENTS

| | | |
|---|---|---|
| WO | 2012/098129 A2 | 7/2012 |
| WO | 2012/138083 A2 | 10/2012 |
| WO | 2013/111997 A1 | 1/2013 |

OTHER PUBLICATIONS

International Search Report and Written Opinion issued in corresponding International Patent Application No. PCT/KR2015/000876 dated Apr. 28, 2015.

*Primary Examiner* — Ping Hsieh
(74) *Attorney, Agent, or Firm* — Morgan, Lewis & Bockius LLP

(57) ABSTRACT

A method and apparatus for performing trace recording in a wireless communication system is provided. It is assumed that an evolved NodeB (eNB) is shared by a first operator and a second operator. The UE receives an indication, which allows collecting minimization of drive tests (MDT) logs of a user equipment (UE) of the second operator, from a mobility management entity (MME) of the second operator. Upon collecting the MDT logs, the UE transmits a trace record based on the collected MDT logs to a trace collection entity (TCE) of the first operator.

13 Claims, 13 Drawing Sheets

(56) References Cited

U.S. PATENT DOCUMENTS

2014/0022904 A1\* 1/2014 Ahmad ............. H04W 28/0289
370/235
2014/0370914 A1 12/2014 Jung et al.
2015/0126130 A1\* 5/2015 Hong .................... H04W 24/10
455/67.11
2015/0334645 A1\* 11/2015 Di Chiara ............. H04W 48/18
455/422.1

\* cited by examiner

METHOD AND APPARATUS FOR SUPPORTING MINIMIZATION OF DRIVE TESTS FOR RADIO ACCESS NETWORK SHARING IN WIRELESS COMMUNICATION SYSTEM

BACKGROUND OF THE INVENTION

Field of the Invention

The present invention relates to wireless communications, and more particularly, to a method and apparatus for supporting minimization of drive tests (MDT) for radio access network (RAN) sharing in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Radio access network (RAN) sharing is a way for operators to share the heavy deployment costs for mobile networks, especially in the roll-out phase. In the current mobile telephony marketplace, functionality that enables various forms of RAN sharing is becoming more and more important. Multiple operators can share radio network resources and create potential requirements that complement existing system capabilities for sharing common E-UTRAN resources.

Minimization of drive tests (MDT) is a feature introduced in 3GPP LTE rel-10 to allow the harvesting of network coverage and quality information from customer user equipments (UEs) as they move within the coverage of the RAN. This provides better quality data, at a lower cost, than that produced by the RAN operator performing drive testing of the RAN using test UEs.

In area based MDT, MDT data is collected from UEs in a specified area. The area is defined as a list of cells or as a list of tracking/routing/location areas. The area based MDT is an enhancement of the management based trace functionality. Area based MDT may be either a logged MDT or immediate MDT. In signaling based MDT, MDT data is collected from one specific UE. The signaling based MDT is an enhancement of the signaling based subscriber and equipment trace. A signaling based MDT can be either a logged MDT or Immediate MDT.

A method for enhancing MDT in RAN sharing environment may be required.

SUMMARY OF THE INVENTION

The present invention provides a method and apparatus for supporting minimization of drive tests (MDT) for radio access network (RAN) sharing in a wireless communication system. The present invention provides a method for enhancing signaling based MDT in RAN sharing environment. The present invention provides a method for performing trace record for a hosting operator based on MDT logs of participating operator's user equipments (UEs).

In an aspect, a method for performing, by an evolved NodeB (eNB) which is shared by a first operator and a second operator, trace recording in a wireless communication system is provided. The method includes receiving, by the eNB, an indication, which allows collecting minimization of drive tests (MDT) logs of a user equipment (UE) of the second operator, from a mobility management entity (MME) of the second operator, collecting, by the eNB, the MDT logs, and transmitting, by the eNB, a trace record based on the collected MDT logs to a trace collection entity (TCE) of the first operator.

In another aspect, an evolved NodeB (eNB), which is shared by a first operator and a second operator, configured to perform trace recording in a wireless communication system is provided. The eNB includes a radio frequency (RF) unit configured to transmit or receive a radio signal, and a processor coupled to the RF unit, and configured to receive an indication, which allows collecting minimization of drive tests (MDT) logs of a user equipment (UE) of the second operator, from a mobility management entity (MME) of the second operator, collect the MDT logs, and transmit a trace record based on the collected MDT logs to a trace collection entity (TCE) of the first operator.

A hosting operator can collect MDT data of participating operator's UEs.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
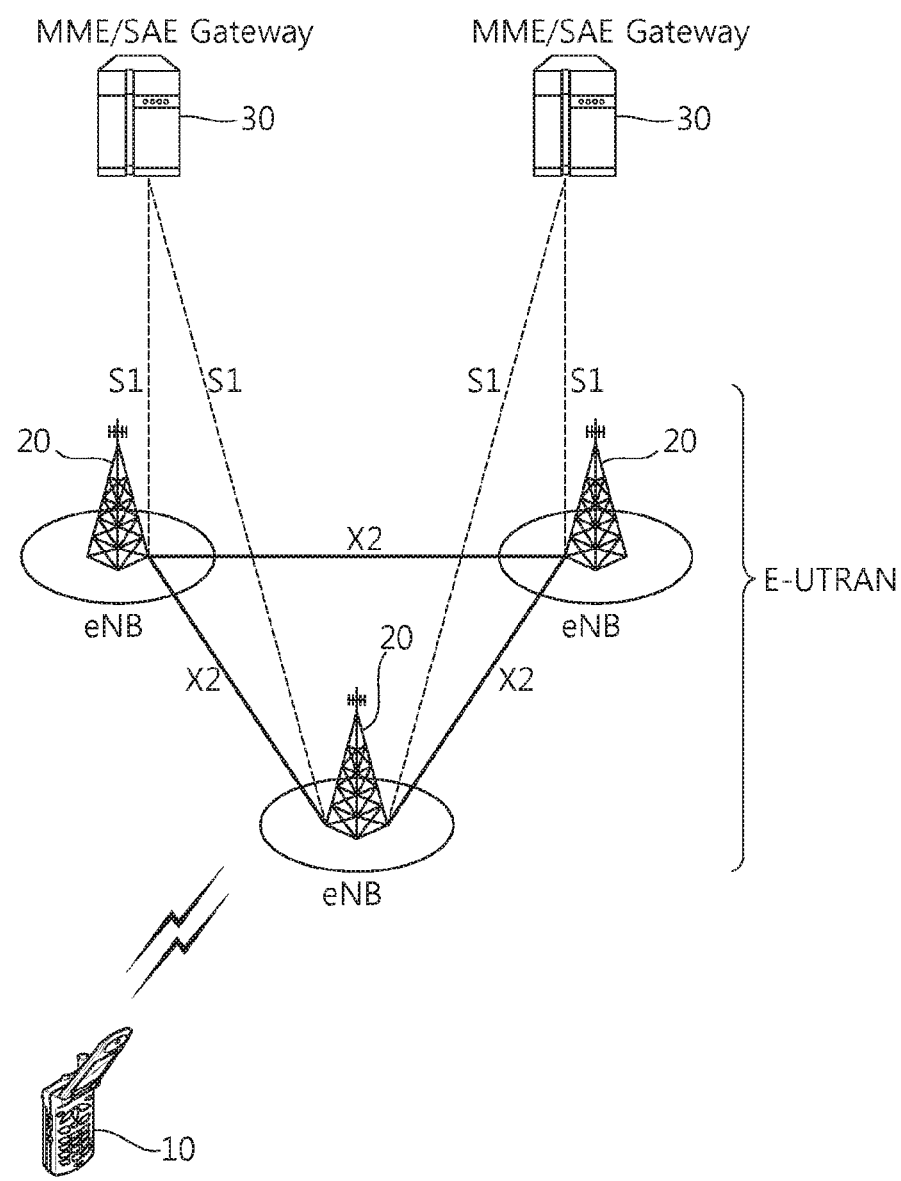
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
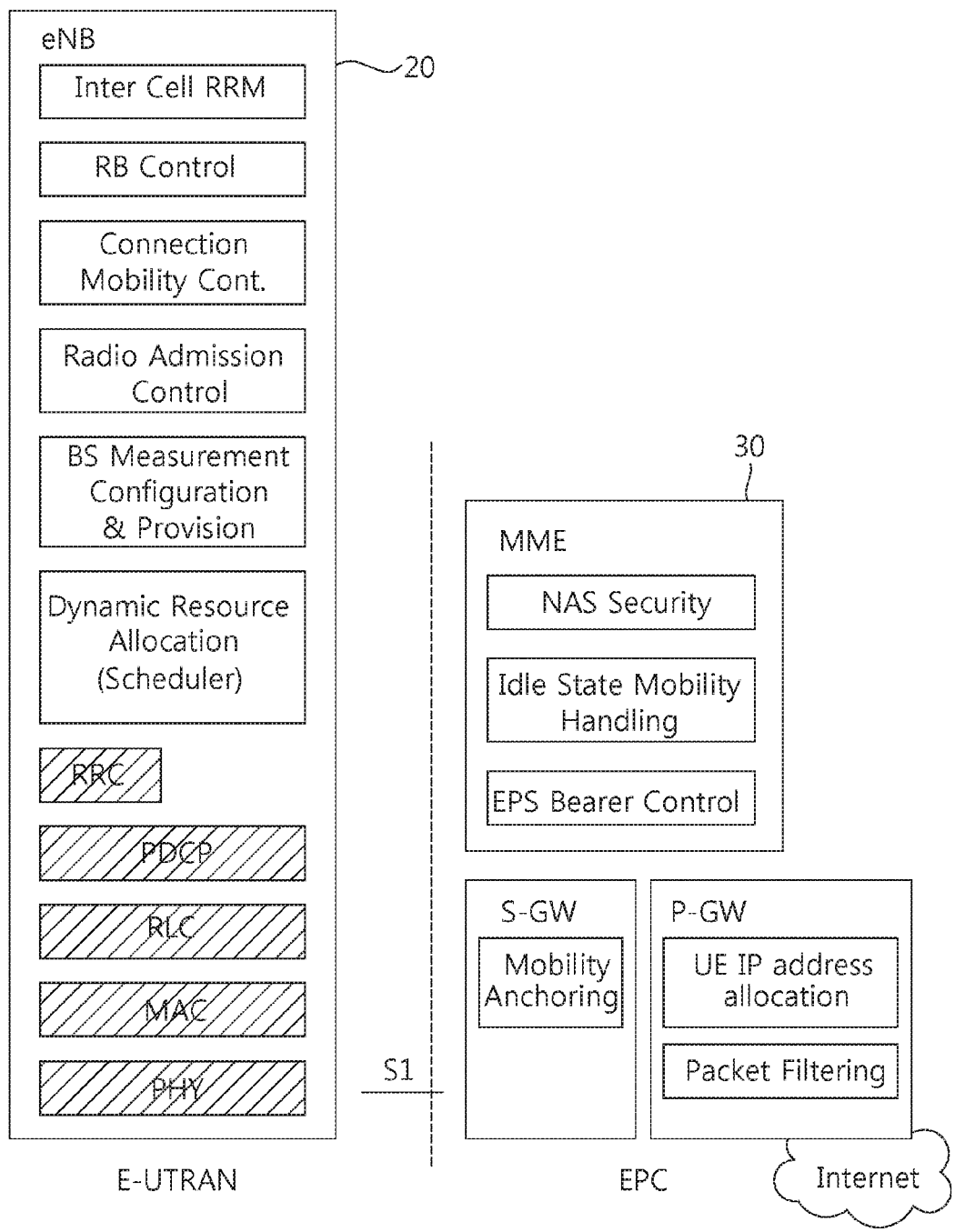
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
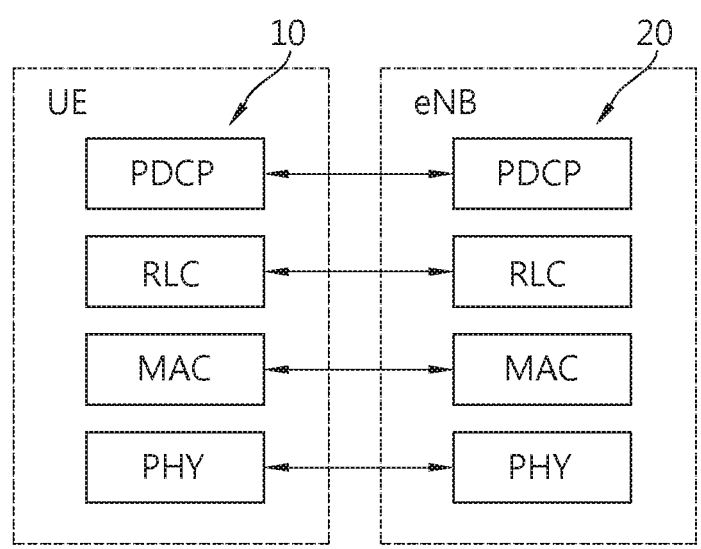
FIG. 3 shows a block diagram of a user plane protocol stack of an LTE system.
Figure 4:
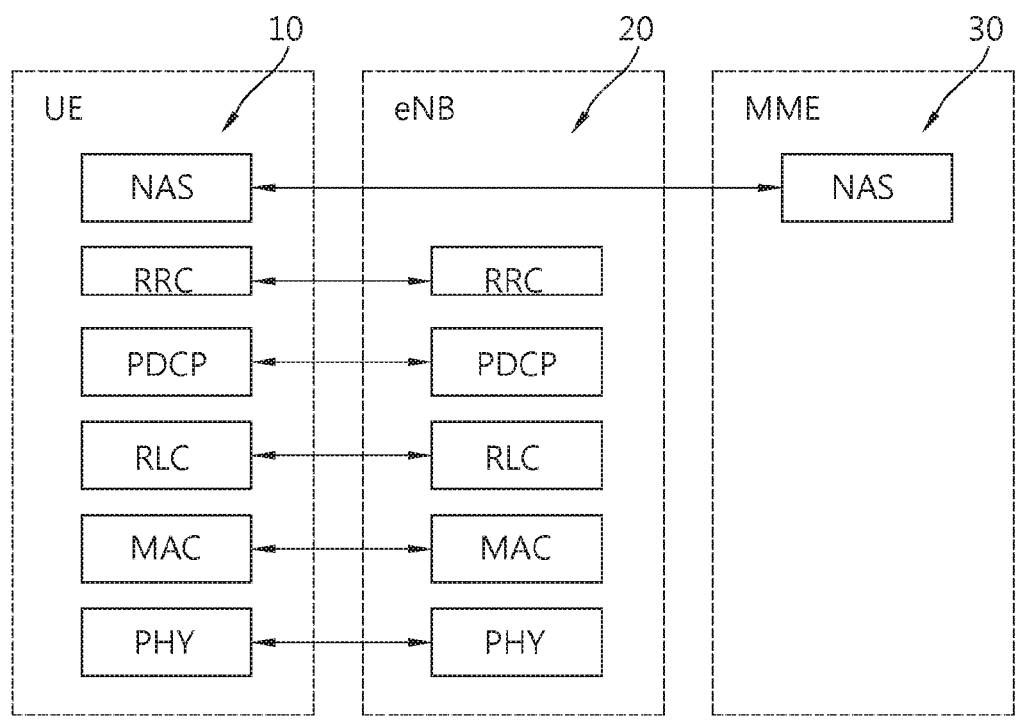
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
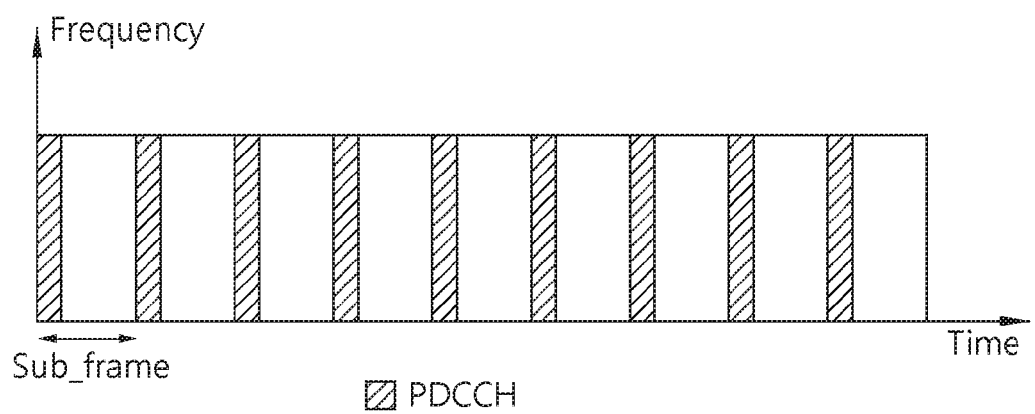
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Radio access network (RAN) sharing is described. It may be referred to 3GPP TR 22.852 V12.0.0 (2013-06). The arrangements for RAN sharing between the involved entities can vary widely, being influenced by a number of factors including business, technical, network deployment and regulatory conditions. Within all of this variation, there is a set of common roles centered around connecting network facilities between the parties participating in RAN sharing agreement.

A hosting RAN provider is a provider of a hosting RAN. The hosting RAN provider is identified as sharing a hosting RAN with one or more participating operators. The characteristics of the hosting RAN provider include:

Has primary operational access to particular licensed spectrum which is part of the RAN sharing arrangement.

Has deployed a RAN in a specific geographic region covered under the RAN sharing arrangement Operates the RAN identified in the previous two items.

Provides facilities allowing participating operators to share the RAN covered under the RAN sharing arrangement Within the concept of the hosting RAN provider, other entities can be involved such as outsourcing, joint ventures, or leasing agreements such as for operating, owning the RAN infrastructure or managing the RAN sharing agreements.

A participating operator is an operator that uses allocated shared RAN resources provided by the hosting RAN provider under RAN sharing agreement. The participating operator is identified as using shared RAN facilities provided by the hosting RAN provider, possibly alongside other participating operators. The characteristics of the participating operator include:

Uses a portion of the particular shared licensed spectrum to provide communication services under its own control to its own subscribers.

Uses a portion of the shared RAN in the specific geographic region covered under the RAN sharing arrangement.

Within the concept of the participating operator, other entities can be involved such as outsourcing, joint ventures, or leasing agreements such as for operating or owning the service infrastructure.

Roaming and roaming agreements between operators provides a similar capability to RAN sharing where a subscriber of a home public land mobile network (HPLMN) can obtain services while roaming into a visited PLMN (VPLMN). This can be viewed as a form of sharing where the VPLMN shares the use of its RAN with the HPLMN for each HPLMN subscriber roaming into the VPLMN.

The distinction between roaming and RAN sharing is:

when roaming, the subscriber uses the VPLMN when outside of the HPLMN geographic coverage and within the VPLMN geographic coverage in a RAN sharing arrangement, all of the participants (hosting RAN provider and one or more participating operators) provide the same geographic coverage through the hosting RAN.

Operators can take on multiple roles at the same time depending on business needs. It may be assumed that each specific network set (spectrum-region-RAN) can be considered independently and combined with other network sets in various combinations. Examples include:

An operator has its own spectrum which is not shared and additionally uses the shared RAN in the same region (participating operator) provided by the hosting RAN provider.

Two operators set up a joint venture to build and operate a shared network. The two operators are both participating operators and the joint venture is the hosting RAN provider.

Two operators A&B, divide a region covered by a joint spectrum license and each build and operate the RAN in their portion of the region. In the region covered by operator A's RAN, operator A is the hosting RAN provider and at the same time the participating operator while operator B is only the participating operator. In the region covered by operator B's RAN, operators A and B are the participating operators and operator B is the hosting RAN provider.

The hosting RAN provider may share E-UTRAN resources with participating operators in various ways. It is assumed that at least a set of radio base stations (RBS) are shared for use by participating operators. The RAN sharing agreement between the hosting RAN provider and participating operators may or may not include sharing of a part of the radio spectrum of the hosting RAN provider. For example, a mobile virtual network operator (MVNO) as a participating operator would use the spectrum provided by the hosting RAN provider. Further, the sharing of core network (CN) nodes, while not excluded, is not considered.

Typically, RAN sharing arises out of the following situations:

A greenfield deployment—two operators jointly agree to build out a new technology (typically 4G). At the outset, the new shared network infrastructure and operations can be based on capacity and coverage requirements of both operators. The operator can, e.g., fund built-on 50:50 or according to their expected needs.

Buy-in—when one of the sharing operator has already built (4G for example) and looking for another operator to share this network. n this case, the second operator would typically either pay a capacity usage fee or up-front fee to acquire in the network.

Various scenarios and use cases have been discussed for RAN sharing. One of scenarios and use cases for RAN sharing is minimization of drive tests (MDT) support for RAN operator. This use case describes the generation & retrieval of MDT data by a hosting RAN provider that does not have an adjunct core network and which therefore does not provide service, other than RAN connectivity, to the UEs connected via its network.

The hosting RAN provider may agree to share RAN resources with one or more participating operators. The hosting RAN provider may not have a core network adjunct to the RAN. All UEs connected through the RAN may be associated with one or more of the participating operators. The participating operators may have RAN sharing agreement with the hosting RAN provider that UEs owned by participating operators are allowed to be selected for MDT data collection purpose triggered by the hosting RAN provider. The hosting RAN provider may require to initiate collection of MDT data.

The hosting RAN provider may request retrieval of MDT data by UEs which is allowed to do this task by participating operators connected to the RAN. The hosting RAN provider may collect the retrieved data. Accordingly, the hosting RAN Provider may be in possession of the coverage & network quality data for the shared RAN provided by MDT.

The RAN sharing architecture shall allow different core network operators to connect to a shared radio access network. The operators do not only share the radio network elements, but may also share the radio resources themselves. In addition to this shared radio access network, the operators may or may not have additional dedicated radio access networks, like for example, 2G radio access networks.

There are two identified architectures to be supported by RAN sharing. In both architectures, the radio access network is shared. First architecture is a gateway core network (GWCN). In the GWCN, besides shared radio access network nodes, the core network operators also share core network nodes. That is, mobility management entities (MMEs) serving the shared radio access network nodes are also shared. Second architecture is a multi-operator core network (MOCN). In the MOCN, only the radio access network is shared. The core network nodes are operated by different operators.

Figure 6:
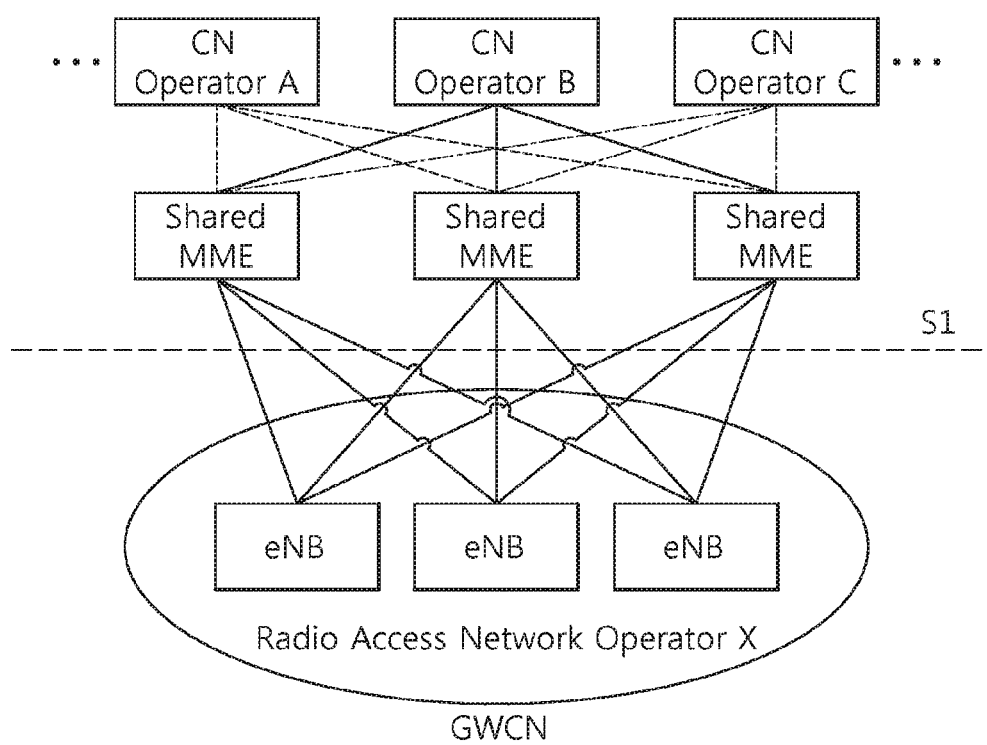
FIG. 6 shows an example of GWCN architecture.

FIG. 6 shows an example of GWCN architecture. Referring to FIG. 6, core network operator A, B, and C shares a plurality of eNBs and a plurality of MMEs serving the plurality of eNBs.

Figure 7:
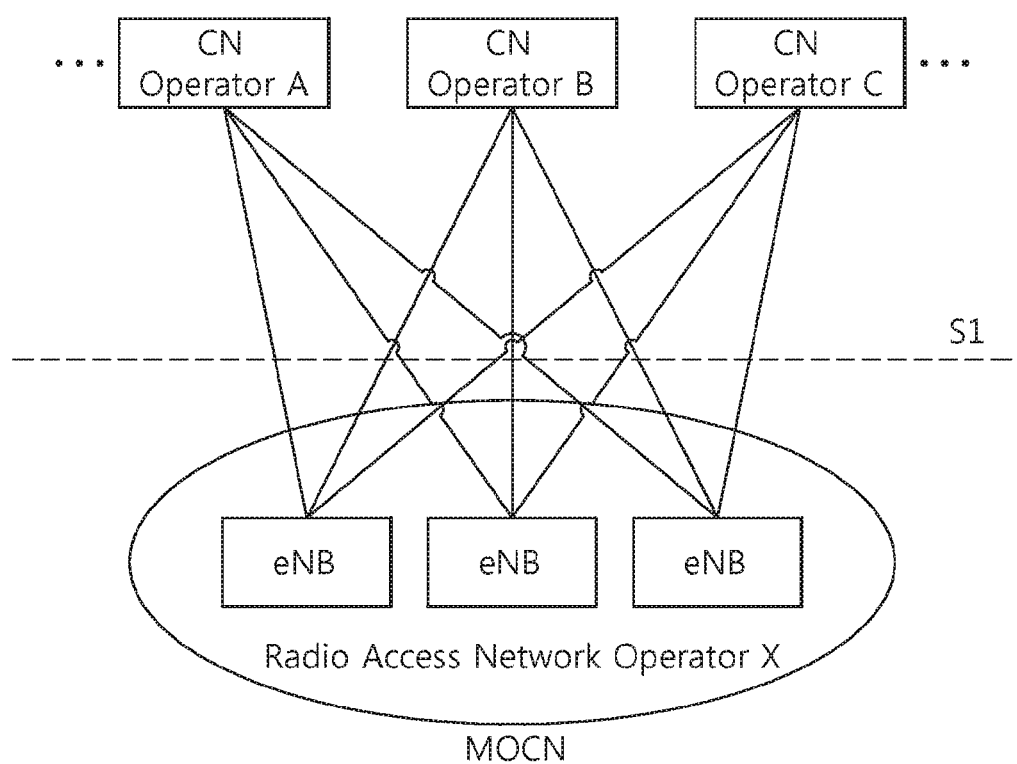
FIG. 7 shows an example of MOCN architecture.

FIG. 7 shows an example of MOCN architecture. Referring to FIG. 7, core network operator A, B, and C shares only a plurality of eNBs.

Figure 8:
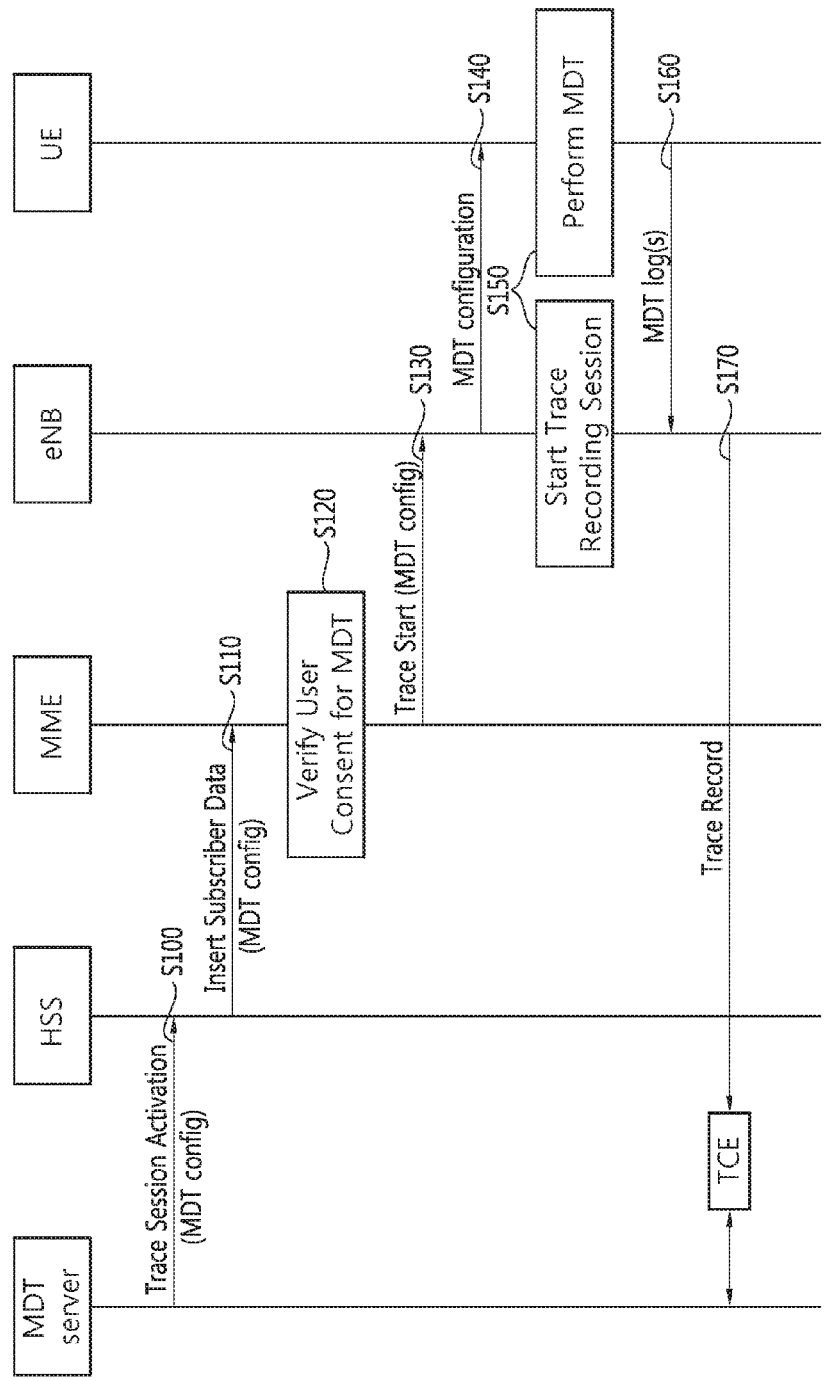
FIG. 8 shows an example of activation of a signaling based MDT.

FIG. 8 shows an example of activation of a signaling based MDT. In step S100, the MDT server initiates trace session activation by sending an MDT configuration to the home subscriber server (HSS). In step S110, the USS inserts subscriber data with the MDT configuration and then sends to the MME.

In step S120, the MME verifies user consent for MDT. In step S130, the MME transmits a trace start message including the MDT configuration to the eNB. Table 1 shows an example of the trace start message. The trace start message is sent by the MME to initiate trace recording for a UE.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| Trace Activation | M | | 9.2.1.4 | | YES | ignore |

Referring to Table 1, the trace start message includes "Trace Activation" information element (IE). Table 2 shows an example of the Trace Activation IE. The Trace Activation IE defines parameters related to a trace activation.

TABLE 2

| IE/Group Name | Presence | Range | IE type and reference | Semantics description | Criticality | Assigned Criticality |
|---|---|---|---|---|---|---|
| E-UTRAN Trace ID | M | | OCTET STRING (8) | The E-UTRAN Trace ID IE is composed of the following: Trace Reference defined in TS 32.422 [10] (leftmost 6 octets, with PLMN information coded as in 9.2.3.8), and Trace Recording Session Reference defined in TS 32.422 [10] (last 2 octets). | | |
| Interfaces To Trace | M | | BIT STRING (8) | Each position in the bitmap represents a eNB interface: first bit = S1-MME, second bit = X2, third bit = Uu: other bits reserved for future use. Value '1' indicates 'should be traced'. Value '0' indicates 'should not be traced'. | | |
| Trace depth | M | | ENUMERATED (minimum, medium, maximum, MinimumWithout VendorSpecific Extension, MediumWithout VendorSpecific Extension, MaximumWithout VendorSpecific Extension, . . . ) | Defined in TS 32.422 [10]. | | |

TABLE 2-continued

| IE/Group Name | Presence | Range | IE type and reference | Semantics description | Criticality | Assigned Criticality |
|---|---|---|---|---|---|---|
| Trace Collection Entity IP Address | M | | Transport Layer Address 9.2.2.1 | Defined in TS 32.422 [10]. | | |
| MDT Configuration | O | | 9.2.1.81 | | YES | ignore |

Referring to Table 2, the Trace Activation IE includes "Trace Collection Entity IP Address" IE, which indicates an IP address of a trace collection entity (TCE). Further, the Trace Activation IE includes "MDT Configuration" IE.

Table 3 to 5 shows an example of the MDT Configuration IE. The MDT Configuration IE defines the MDT configuration parameters.

TABLE 3

| IE/Group Name | Presence | Range | IE type and reference | Semantics description | Criticality | Assigned Criticality |
|---|---|---|---|---|---|---|
| MDT Activation | M | | ENUMERATED (Immediate MDT only, Logged MDT only, Immediate MDT and Trace, . . . ) | | — | — |
| CHOICE Area Scope of MDT | M | | | | — | — |
| >Cell based | | | | | | — |
| >>Cell ID List for MDT | | 1 . . . <maxnoofCellIDforMDT> | | | | — |
| >>>E-CGI | M | | 9.2.1.38 | | — | — |
| >TA based | | | | | | — |
| >>TA List for MDT | | 1 . . . <maxnoofTAforMDT> | | | | — |
| >>>TAC | M | | 9.2.3.7 | The TAI is derived using the current serving PLMN. | — | — |
| >PLMN Wide | | | NULL | | — | — |
| >TAI based | | | | | — | — |
| >>TAI List for MDT | | 1 . . . <maxnoofTAforMDT> | | | — | — |
| >>>TAI | M | | 9.2.3.16 | | — | — |
| CHOICE MDT Mode | M | | | | | — |
| >Immediate MDT | | | | | | |
| >>Measurements to Activate | M | | BITSTRING (SIZE(8)) | Each position in the bitmap indicates a MDT measurement, as defined in TS 37.320 [31]. First Bit = M1, Second Bit = M2, Third Bit = M3, Fourth Bit = M4, Fifth Bit = M5, Sixth Bit = logging of M1 from event triggered measurement reports according to existing RRM configuration. Other bits are reserved for future use and are ignored if received. | — | — |

TABLE 3-continued

| IE/Group Name | Presence | Range | IE type and reference | Semantics description | Criticality | Assigned Criticality |
|---|---|---|---|---|---|---|
| | | | | Value "1" indicates "activate" and value "0" indicates "do not activate". | | |
| >>M1 Reporting Trigger | M | | ENUMERATED (periodic, A2event-triggered, . . . , A2event-triggered periodic) | This IE shall be ignored if the Measurements to Activate IE has the first bit set to "0". | — | — |
| >>M1 Threshold Event A2 | C-ifM1A2 trigger | | | Included in case of event-triggered or event-triggered periodic reporting for measurement M1. | — | — |
| >>>CHOICE Threshold | M | | | | — | — |
| >>>>RSRP | | | | | | — |
| >>>>Threshold RSRP | M | | INTEGER (0 . . . 97) | This IE is defined in TS 36.331 [16]. | — | — |
| >>>>RSRQ | | | | | | — |
| >>>>>Threshold RSRQ | M | | INTEGER (0 . . . 34) | This IE is defined in TS 36.331 [16]. | — | — |
| >>M1 Periodic reporting | C-ifperiodic MDT | | | Included in case of periodic or event-triggered periodic reporting for measurement M1. | — | — |
| >>>Report interval | M | | ENUMERATED (ms120, ms240, ms480, ms640, ms1024, ms2048, ms5120, ms10240, min1, min6, min12, min30, min60) | This IE is defined in TS 36.331 [16]. | — | — |
| >>>Report amount | M | | ENUMERATED (1, 2, 4, 8, 16, 32, 64, infinity) | Number of reports. | — | — |
| >>M3 Configuration | C-ifM3 | | 9.2.1.86 | | YES | ignore |
| >>M4 Configuration | C-ifM4 | | 9.2.1.87 | | YES | ignore |
| >>M5 Configuration | C-ifM5 | | 9.2.1.88 | | YES | ignore |
| >>MDT Location Information | O | | BITSTRING(SIZE (8)) | Each position in the bitmap represents requested location information as defined in TS 37.320 [31]. First Bit = GNSS Second Bit = E-CID information. Other bits are reserved for future use and are ignored if received. | YES | ignore |

TABLE 3-continued

| IE/Group Name | Presence | Range | IE type and reference | Semantics description | Criticality | Assigned Criticality |
|---|---|---|---|---|---|---|
| | | | | Value "1" indicates "activate" and value "0" indicates "do not activate". The eNB shall ignore the first bit unless the Measurements to Activate IE has the first bit or the sixth bit set to "1". | | |
| >Logged MDT | | | | | — | — |
| >>Logging interval | M | | ENUMERATED (1.28, 2.56, 5.12, 10.24, 20.48, 30.72, 40.96 and 61.44) | This IE is defined in TS 36.331 [16]. Unit: [second]. | — | — |
| >>Logging duration | M | | ENUMERATED (10, 20, 40, 60, 90 and 120) | This IE is defined in TS 36.331 [16]. Unit: [minute]. | — | — |
| Signalling based MDT PLMN List | O | | MDT PLMN List 9.2.1.89 | | YES | ignore |

TABLE 4

| Range bound | Explanation |
|---|---|
| maxnoofCellIDforMDT | Maximum no. of Cell ID subject for MDT scope. Value is 32. |
| maxnoofTAforMDT | Maximum no. of TA subject for MDT scope. Value is 8. |

TABLE 5

| Condition | Explanation |
|---|---|
| ifM1A2trigger | This IE shall be present if the Measurements to Activate IE has the first bit set to "1" and the M1 Reporting Trigger IE is set to "A2event-triggered" or to "A2event-triggered periodic". |
| ifperiodicMDT | This IE shall be present if the M1 Reporting Trigger IE is set to "periodic", or to "A2event-triggered periodic". |
| ifM3 | This IE shall be present if the Measurements to Activate IE has the third bit set to "1". |
| ifM4 | This IE shall be present if the Measurements to Activate IE has the fourth bit set to "1". |
| ifM5 | This IE shall be present if the Measurements to Activate IE has the fifth bit set to "1". |

Referring to Table 3, the MDT Configuration IE includes "MDT PLMN List" IE.

Back to FIG. 8, in step S140, the eNB transmits the MDT configuration to the UE. In step S150, the eNB stars trace recording session, and the UE performs MDT.

In step S160, the UE transmits MDT logs to the eNB. In step 170, the eNB transmits a trace record based on the received MDT logs to the TCE. The data may be used for system optimization.

The current mechanism for activation of signaling based MDT may be enhanced in the RAN sharing environment, in which the eNB is shared by a plurality of operators. The new requirement is that when authorized by the participating operators, the hosting operator shall be able to collect MDT data of the participating operator's UEs connected through the RAN. However currently, the eNB cannot know other operator's TCE for a specific UE's MDT log reporting since there is no information from CN about that. Specifically, the MDT logs should be reported to both TCEs of the participating operator and the hosting operator, however, the participating eNB cannot know other operator's TCE for a specific UE's MDT log reporting. Even though signaling based MDT is taken as an example, similar problems may happen to the management based MDT.

In order to solve the problem described above, a method for enhancing signaling based MDT and performing trace record according to an embodiment of the present invention is described below.

Figure 9:
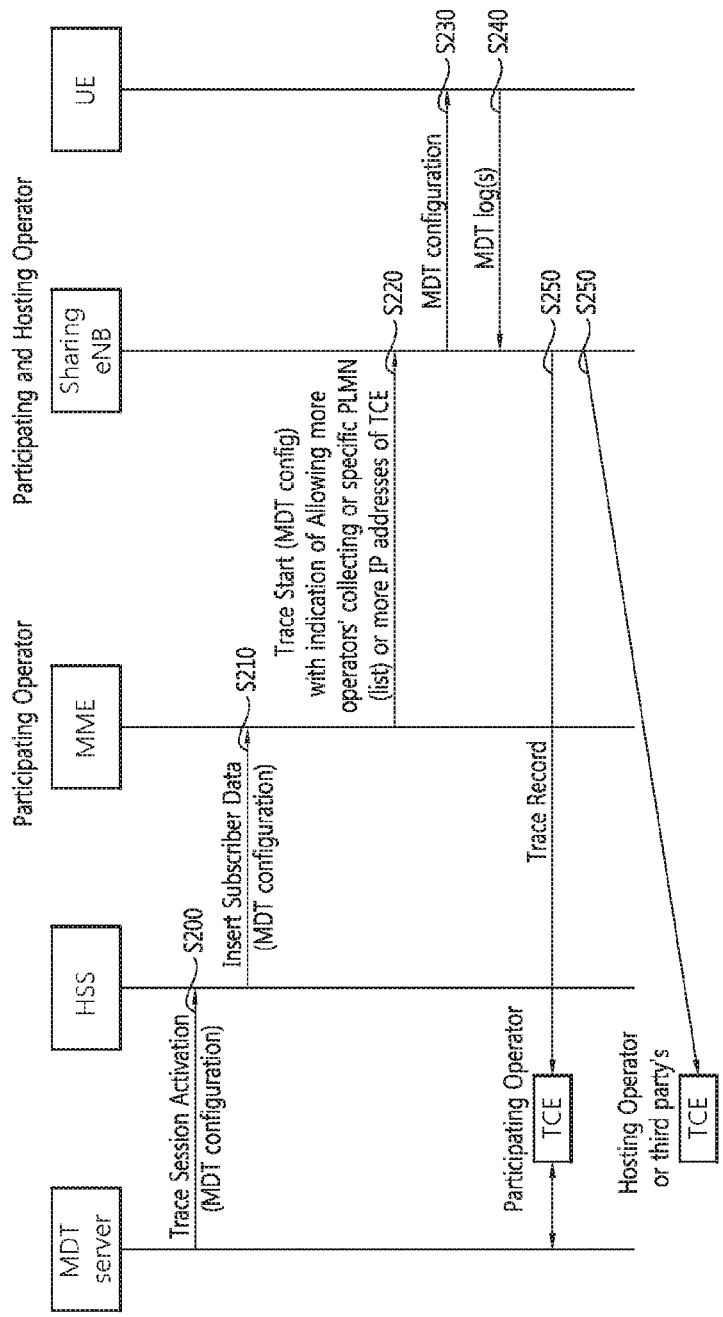
FIG. 9 shows an example of procedures of signaling based MDT according to an embodiment of the present invention.

FIG. 9 shows an example of procedures of signaling based MDT according to an embodiment of the present invention. In step S200, the MDT server initiates trace session activation by sending an MDT configuration with additional policy of a specific UE for RAN sharing to the HSS. In step S210, the HSS inserts subscriber data with the policy of the specific UE for RAN sharing and then sends to the MME of the participating operator.

In step S220, the MME of the participating operator transmits a trace start message with an indication to the sharing eNB, which is shared by the hosting operator and the participating operator. The indication may allow the hosting RAN to collect MDT logs of UEs of the participating operator. The indication may be a specific PLMN or a list of PLMNs, which is the PLMN of the hosting RAN to collect MDT logs of UEs of the participating operator. The specific PLMN or list of PLMNs is different from the existing PLMN list included in the MDT configuration IE (Signalling based MDT PLMN List IE), which is the PLMN list for MDT. Further, the indication may be one or more additional TCE IP address, which is different from the existing TCE IP address included in the Trace Activation IE (Trace Collection Entity IP Address IE). The one or more additional TCE IP address may indicate a possible reporting destination after obtaining MDT data from the UE to the sharing eNB. In this case, the possible reporting destination may be a TCE of the participating operator, TCE of the hosting operator, TCEs of both the participating operator and hosting operator, or TCE of the third-party.

Table 6 shows an example of the trace start message according to an embodiment of the present invention.

TABLE 6

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| Trace Activation | M | | 9.2.1.4 | | YES | ignore |
| Indication of Allowing more operators' collecting | O | | | | | |

Referring to Table 6, the trace start message may include "Indication of Allowing more operators' collecting" IE, which allows the hosting RAN to collect MDT logs of UEs of a plurality of operators.

Table 7 shows an example of the Trace Activation IE according to an embodiment of the present invention.

TABLE 7

| IE/Group Name | Presence | Range | IE type and reference | Semantics description | Criticality | Assigned Criticality |
|---|---|---|---|---|---|---|
| E-UTRAN Trace ID | M | | OCTET STRING (8) | The E-UTRAN Trace ID IE is composed of the following: Trace Reference defined in TS 32.422 [10] (leftmost 6 octets, with PLMN information coded as in 9.2.3.8), and Trace Recording Session Reference defined in TS 32.422 [10] (last 2 octets). | | |
| Interfaces To Trace | M | | BIT STRING (8) | Each position in the bitmap represents a eNB interface: first bit = S1-MME, second bit = X2, third bit = Uu: other bits reserved for future use. Value '1' indicates 'should be traced'. Value '0' indicates 'should not be traced'. | | |
| Trace depth | M | | ENUMERATED (minimum, medium, maximum, MinimumWithout VendorSpecific Extension, MediumWithout VendorSpecific Extension, MaximumWithout VendorSpecific Extension, . . . ) | Defined in TS 32.422 [10]. | | |
| Trace Collection Entity IP Address | M | | 1 . . . <maxnoofTCEforMDT> | | | |
| >TCE IP Address of participating operator | O | | Transport Layer Address 9.2.2.1 | Defined in TS 32.422 [10]. | | |
| > TCE IP Address of hosting operator | O | | Transport Layer Address 9.2.2.1 | Defined in TS 32.422 [10]. | | |

TABLE 7-continued

| IE/Group Name | Presence | Range | IE type and reference | Semantics description | Criticality | Assigned Criticality |
|---|---|---|---|---|---|---|
| > TCE IP Addresses of both participating operator and hosting operator | O | | Transport Layer Address 9.2.2.1 | Defined in TS 32.422 [10]. | | |
| > TCE IP Address of third party | O | | Transport Layer Address 9.2.2.1 | Defined in TS 32.422 [10]. | | |
| MDT Configuration | O | | 9.2.1.81 | | YES | ignore |

Referring to Table 7, the Trace Activation IE may include "TCE IP Address of participating operator" IE, "TCE IP Address of hosting operator" IE, "TCE IP Address of both participating operator and hosting operator" IE, and "TCE IP Address of third party" IE, in addition to the existing Trace Collection Entity IP Address IE. Each IE may indicate an IP address of the TCE of the participating operator, IP address of the TCE of the hosting operator, IP addresses of TCEs of both the participating operator and hosting operator, and IP address of TCE of the third-party, respectively.

Table 8 shows an example of the MDT configuration IE according to an embodiment of the present invention. Table 4 and 5 described above may be applied to the MDT configuration IE shown in Table 8.

TABLE 8

| IE/Group Name | Presence | Range | IE type and reference | Semantics description | Criticality | Assigned Criticality |
|---|---|---|---|---|---|---|
| MDT Activation | M | | ENUMERATED (Immediate MDT only, Logged MDT only, Immediate MDT and Trace, . . . ) | | — | — |
| CHOICE Area Scope of MDT | M | | | | — | — |
| >Cell based | | | | | | — |
| >>Cell ID List for MDT | | 1 . . . <maxnoofCellIDforMDT> | | | | — |
| >>>E-CGI | M | | 9.2.1.38 | | | — |
| >TA based | | | | | | — |
| >>TA List for MDT | | 1 . . . <maxnoofTAforMDT> | | | | — |
| >>>TAC | M | | 9.2.3.7 | The TAI is derived using the current serving PLMN. | — | — |
| >PLMN Wide | | | NULL | | — | — |
| >TAI based | | | | | — | — |
| >>TAI List for MDT | | 1 . . . <maxnoofTAforMDT> | | | — | — |
| >>>TAI | M | | 9.2.3.16 | | — | — |
| CHOICE MDT Mode | M | | | | | — |
| >Immediate MDT | | | | | | — |
| >>Measurements to Activate | M | | BITSTRING (SIZE(8)) | Each position in the bitmap indicates a MDT measurement, as defined in TS 37.320 [31]. First Bit = M1, Second Bit = M2, Third Bit = M3, Fourth Bit = M4, Fifth Bit = M5, Sixth Bit = logging of M1 | — | — |

TABLE 8-continued

| IE/Group Name | Presence | Range | IE type and reference | Semantics description | Criticality | Assigned Criticality |
|---|---|---|---|---|---|---|
| | | | | from event triggered measurement reports according to existing RRM configuration. Other bits are reserved for future use and are ignored if received. Value "1" indicates "activate" and value "0" indicates "do not activate". | | |
| >>M1 Reporting Trigger | M | | ENUMERATED (periodic, A2event-triggered,, . . . , A2event-triggered periodic) | This IE shall be ignored if measurement M1 is not activated. | — | — |
| >>M1 Threshold Event A2 | C-ifM1A2 trigger | | | Included in case of event-triggered or event-triggered periodic reporting for measurement M1. | — | — |
| >>>CHOICE Threshold | M | | | | — | — |
| >>>>RSRP | | | | | | — |
| >>>>>Threshold RSRP | M | | INTEGER (0 . . . 97) | This IE is defined in TS 36.331 [16]. | — | — |
| >>>>RSRQ | | | | | | — |
| >>>>>Threshold RSRQ | M | | INTEGER (0 . . . 34) | This IE is defined in TS 36.331 [16]. | — | — |
| >>M1 Periodic reporting | C-ifperiodic MDT | | | Included in case of periodic or event-triggered periodic reporting for measurement M1. | — | — |
| >>>Report interval | M | | ENUMERATED (ms120, ms240, ms480, ms640, ms1024, ms2048, ms5120, ms10240,, min1, min6, min12, min30, min60) | This IE is defined in TS 36.331 [16]. | — | — |
| >>>Report amount | M | | ENUMERATED (1, 2, 4, 8, 16, 32, 64, infinity) | Number of reports. | — | — |
| >>M3 Configuration | C-ifM3 | | 9.2.1.86 | | YES | ignore |
| >>M4 Configuration | C-ifM4 | | 9.2.1.87 | | YES | ignore |
| >>M5 Configuration | C-ifM5 | | 9.2.1.88 | | YES | ignore |
| >>MDT Location Information | O | | BITSTRING(SIZE (8)) | Each position in the bitmap represents requested location information as | YES | ignore |

TABLE 8-continued

| IE/Group Name | Presence | Range | IE type and reference | Semantics description | Criticality | Assigned Criticality |
|---|---|---|---|---|---|---|
| | | | | defined in TS 37.320 [31]. First Bit = GNSS Second Bit = E-CID information. Other bits are reserved for future use and may be ignored if received. Value "1" indicates "activate" and value "0" indicates "do not activate". The eNB shall ignore the first bit unless the M1 measurement is activated. | | |
| >Logged MDT | | | | | — | — |
| >>Logging interval | M | | ENUMERATED (1.28, 2.56, 5.12, 10.24, 20.48, 30.72, 40.96 and 61.44) | This IE is defined in TS 36.331 [16]. Unit: [second]. | — | — |
| >>Logging duration | M | | ENUMERATED (10, 20, 40, 60, 90 and 120) | This IE is defined in TS 36.331 [16]. Unit: [minute]. | — | — |
| Signalling based MDT PLMN List | O | | MDT PLMN List 9.2.1.89 | | YES | ignore |
| Allowing more operator's collecting indicator or a PLMN (list) | O | | | | | |

Referring to Table 8, the MDT configuration IE may include "Allowing more operator's collecting indicator or a PLMN (list)" IE, which may allow the hosting RAN to collect MDT logs of UEs of a plurality of operators, or may indicate the specific PLMN or the list of PLMNs.

Back to FIG. 9, in step S230, the sharing eNB transmits the MDT configuration to the UE. The UE performs the MDT, and in step S240, reports the MDT logs to the sharing eNB.

In step S250, the sharing eNB checks the PLMN or list of PLMNs in the MDT log's and/or the indication received in step S220 described above. Then the sharing eNB decides the reporting destination, and transmits the trace record to the reporting destination. The reporting destination may the TCE of the participating operator, TCE of the hosting operator, TCEs of both the participating operator and hosting operator, or TCE of the third-party.

Figure 10:
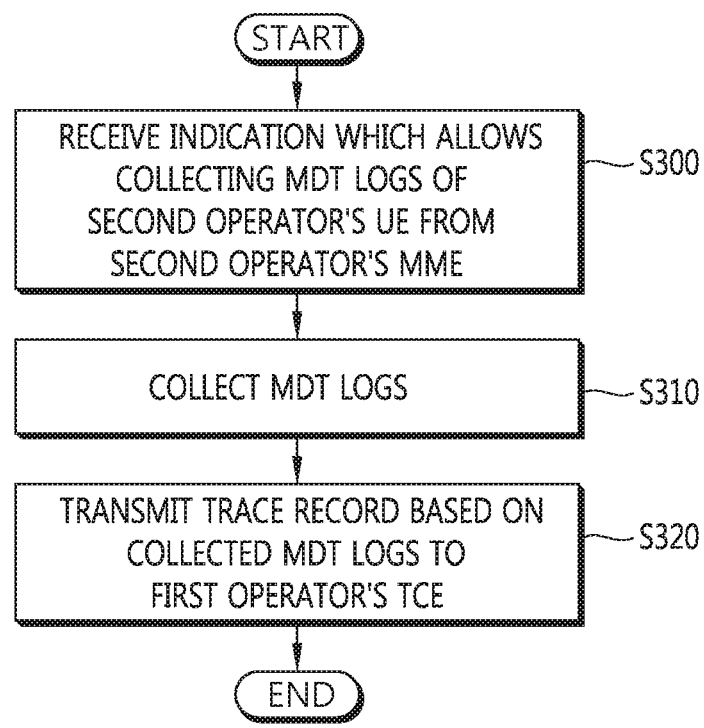
FIG. 10 shows an example of a method for performing trace recording according to an embodiment of the present invention.

FIG. 10 shows an example of a method for performing trace recording according to an embodiment of the present invention. It is assumed that the eNB is shared by a first operator and a second operator. The first operator may be a hosting operator. The second operator may be a participating opereator.

In step S300, the eNB receives an indication, which allows collecting MDT logs of a UE of the second operator, from the MME of the second operator. The indication may be received via a trace start message. The indication may indicate a possible reporting destination of the trace record. In this case, the indication may be at least one of an IP address of the TCE, i.e., an IP address of the TCE of the second operator, an IP address of the TCE of the first operator, IP addresses of TCEs of the first operator and the second operator, or an IP address of the third-party. The indication may be included in a trace activation IE in the trace start message. Further, the indication may indicate a specific PLMN. In this case, the specific PLMN may be a PLMN of the first operator. The indication may be included in a MDT configuration IE in the trace activation IE in the trace start message.

The eNB transmits an MDT configuration to the UE. In step S310, the eNB collects the MDT logs. In step S320, the eNB transmits a trace record based on the collected MDT logs to the TCE of the first operator. Further, the eNB may transmit the trace record to the TCE of the second operator and/or the TCE of the third-party.

The embodiment of the present invention described above may be applied to the management based MDT.

Figure 11:
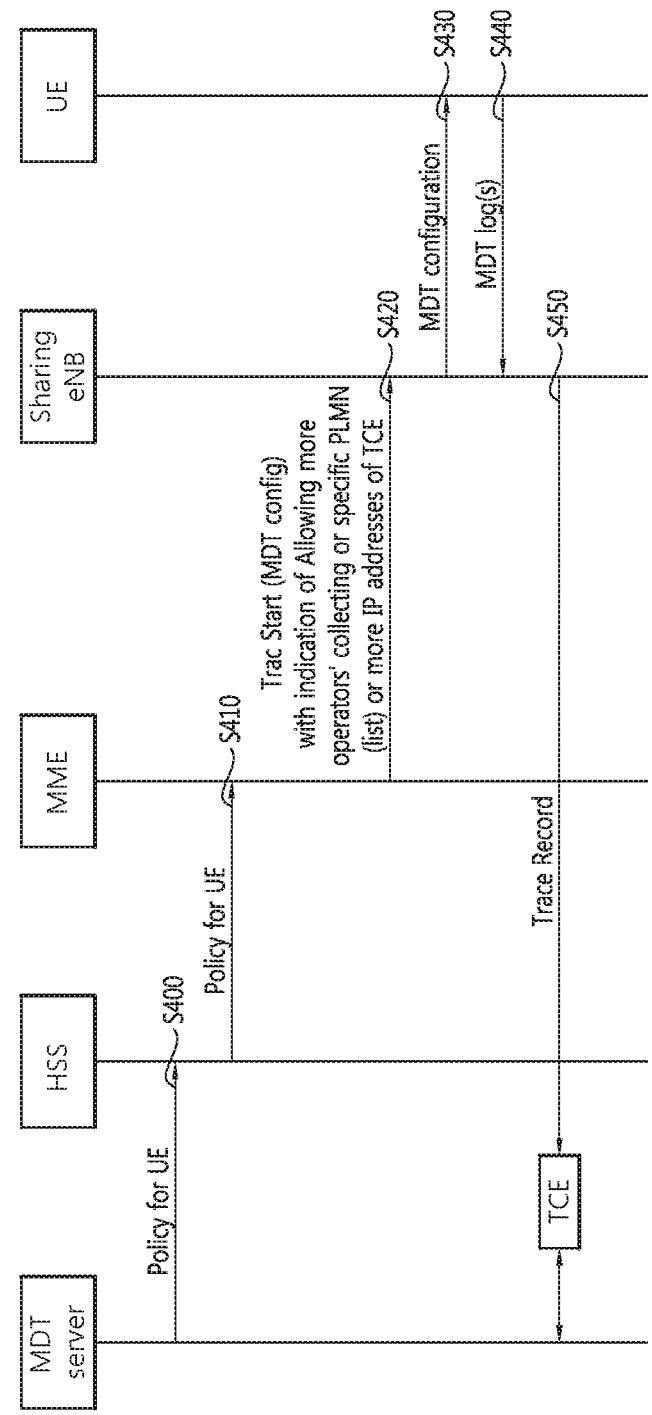
FIG. 11 shows another example of procedures of signaling based MDT according to an embodiment of the present invention.

FIG. 11 shows another example of procedures of signaling based MDT according to an embodiment of the present invention. In step S400, the MDT server initiates trace session activation by sending an MDT configuration with additional policy of a specific UE for RAN sharing to the HSS. In step S410, the HSS inserts subscriber data with the policy and then sends to the MME.

In step S420, the MME transmits a trace start message with an indication to the sharing eNB, which is shared by the hosting operator and the participating operator. The indication may allow the hosting RAN to collect MDT logs of UEs of the participating operator. The indication may be a specific PLMN or a list of PLMNs, which is the PLMN of the hosting RAN to collect MDT logs of UEs of the participating operator. The specific PLMN or list of PLMNs is different from the existing PLMN list included in the MDT configuration IE (Signalling based MDT PLMN List IE), which is the PLMN list for MDT. The indication may be included in the MDT Configuration IE, like Table 8 described above. Further, the indication may be updated for handover messages such as a handover request message. In addition, the S1 initial context setup message may be changed.

In step S430, the sharing eNB transmits the MDT configuration to the UE. The UE performs the MDT, and in step S440, reports the MDT logs to the sharing eNB.

In step S450, the sharing eNB checks the PLMN or list of PLMNs in the MDT log's and/or the indication received in step S420 described above. Then, the sharing eNB decides whether to transmit the trace record to the TCE of the hosting operator or not, and transmits the trace record. If it is decided to transmit the trace record to the TCE of the hosting operator, the trace record may be transmitted to both the corresponding TCE and the TCE of the hosting operator. If it is decided not to transmit the trace record to the TCE of the hosting operator, the trace record may be transmitted only to the corresponding TCE.

Figure 12:
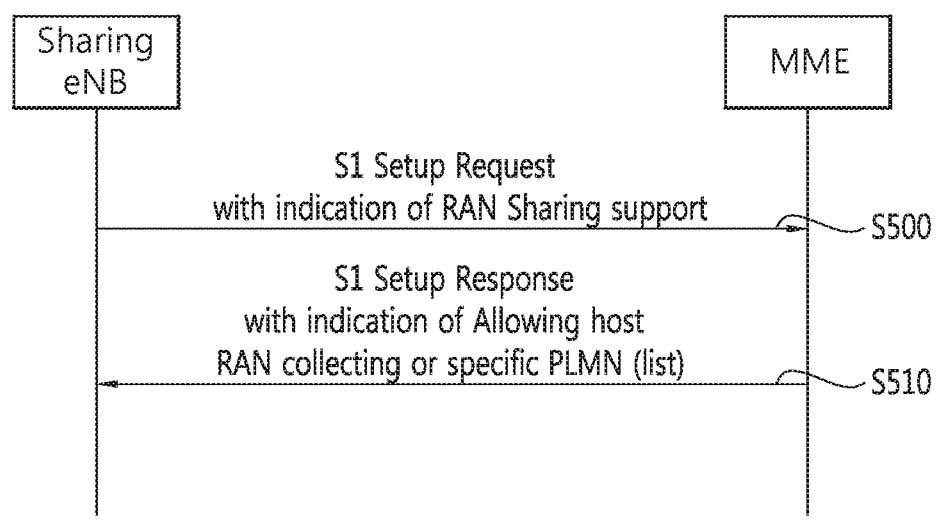
FIG. 12 shows an example of an S1 setup procedure according to an embodiment of the present invention.

FIG. 12 shows an example of an S1 setup procedure according to an embodiment of the present invention.

When S1 interface is setup between the sharing eNB and MME, in step S500, the sharing eNB, which is shared by the hosting operator and the participating operator, transmits an S1 setup request message including an indication of RAN sharing support and sharing policy to the MME. The indication of RAN sharing support may be included in the S1 setup request message as a new IE. Or, the sharing policy itself may be the indication of RAN sharing support.

Table 9 and 10 shows an example of the S1 setup request message according to an embodiment of the present invention. The S1 setup request message is sent by the eNB to transfer information for a transport network layer (TNL) association.

TABLE 9

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | Printable String(1 . . . 150, . . . ) | | YES | ignore |
| Supported TAs | | 1 . . . <maxnoofTACs> | | Supported TAs in the eNB. | GLOBAL | reject |
| >TAC | M | | 9.2.3.7 | Broadcasted TAC. | — | |
| >Broadcast PLMNs | | 1 . . . <maxnoofBPLMNs> | | Broadcasted PLMNs. | — | |
| >>PLMN Identity | M | | 9.2.3.8 | | | |
| Default Paging DRX | M | | 9.2.1.16 | | YES | ignore |
| CSG Id List | | 0 . . . 1 | | | GLOBAL | reject |
| >CSG Id | M | 1 . . . <maxnoofCSGIds> | 9.2.1.62 | | | |
| RAN Sharing support indicator | O | | | | | |

TABLE 10

| Range bound | Explanation |
|---|---|
| maxnoofTACs | Maximum no. of TACs. Value is 256. |
| maxnoofBPLMNs | Maximum no. of Broadcasted PLMNs. Value is 6. |
| maxnoofCSGIds | Maximum no. of CSG Ids within the CSG Id List. Value is 256. |

Referring to Table 9, the S1 setup request message includes "RAN Sharing support indicator" IE, which is the indication of RAN sharing support.

In step S510, the MME transmits an S1 setup response message including an indication to the sharing eNB. The indication may allow the hosting RAN to collect MDT logs of UEs of the participating operator. The indication may be a specific PLMN or a list of PLMNs, which is the PLMN of the hosting RAN to collect MDT logs of UEs of the participating operator. The specific PLMN or list of PLMNs is different from the existing PLMN list included in the MDT configuration IE (Signalling based MDT PLMN List IE), which is the PLMN list for MDT.

Table 11 and 12 shows an example of the S1 setup response message according to an embodiment of the present invention. The S1 setup response message is sent by the MME to transfer information for a TNL association.

TABLE 11

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME Name | O | | PrintableString (1 . . . 150, . . . ) | | YES | ignore |
| Served GUMMEIs | | 1 . . . <maxnoofRATs> | | The LTE related pool configuration is included on the first place in the list. | GLOBAL | reject |
| >Served PLMNs | | 1 . . . <maxnoofPLMNsPerMME> | | | — | |
| >>PLMN Identity | M | | 9.2.3.8 | | — | |
| >Served GroupIDs | | 1 . . . <maxnoofGroupIDs> | | | — | |
| >>MME Group ID | M | | OCTET STRING (2) | | — | |
| >Served MMECs | | 1 . . . <maxnoofMMECs> | | | — | |
| >>MME Code | M | | 9.2.3.12 | | — | |
| Relative MME Capacity | M | | 9.2.3.17 | | YES | ignore |
| MME Relay Support Indicator | O | | 9.2.1.82 | | YES | ignore |
| Criticality Diagnostics | O | | 9.2.1.21 | | YES | ignore |
| Allowing host RAN collecting indicator or a PLMN (list) | O | | | | | |

TABLE 12

| Range bound | Explanation |
|---|---|
| maxnoofPLMNsPerMME | Maximum no. of PLMNs per MME. Value is 32. |
| maxnoofRATs | Maximum no. of RATs. Value is 8. |
| maxnoofGroupIDs | Maximum no. of GroupIDs per node per RAT. Value is 65535. |
| maxnoofMMECs | Maximum no. of MMECs per node per RAT. Value is 256. |

Referring to Table 11, the S1 setup response message includes "Allowing host RAN collecting indicator or a PLMN (list)" IE, which may allow the hosting RAN to collect MDT logs of UEs of a plurality of operators, or may indicate the specific PLMN or the list of PLMNs.

The sharing eNB checks the PLMN or list of PLMNs in the MDT log's and/or the indication received in step S510 described above. Then, the sharing eNB decides whether to transmit the trace record to the TCE of the hosting operator or not, and transmits the trace record. If it is decided to transmit the trace record to the TCE of the hosting operator, the trace record may be transmitted to both the corresponding TCE and the TCE of the hosting operator. If it is decided not to transmit the trace record to the TCE of the hosting operator, the trace record may be transmitted only to the corresponding TCE.

Figure 13:
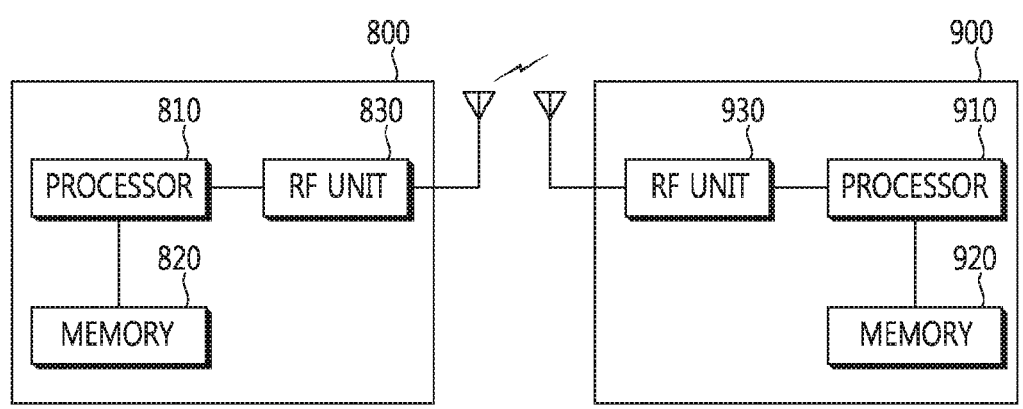
FIG. 13 shows a wireless communication system to implement an embodiment of the present invention.

FIG. 13 shows a wireless communication system to implement an embodiment of the present invention.

An eNB 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A MME or TCE 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by an evolved NodeB (eNB) that is shared by a hosting operator and a participating operator, trace recording in a wireless communication system, the method comprising:

receiving, by the eNB, an indication that allows the eNB to collect minimization of drive tests (MDT) logs of a user equipment (UE) of the participating operator from a mobility management entity (MME) of the participating operator;

if the eNB receives the indication, collecting, by the eNB, both the MDT logs of the UE of the participating operator and MDT logs of a UE of the hosting operator based on the received indication; and transmitting, by the eNB, a trace record based on the collected MDT logs to a trace collection entity (TCE) of the hosting operator.

2. The method of claim 1, wherein the indication is received via a trace start message.

3. The method of claim 1, wherein the indication indicates a possible reporting destination of the trace record.

4. The method of claim 3, wherein the indication is at least one Internet protocol (IP) address of at least one TCE.

5. The method of claim 4, wherein the at least one IP address of the at least one TCE is at least one of: an IP address of a TCE of the participating operator, an IP address of a TCE of the hosting operator, IP addresses of TCEs of the hosting operator and the participating operator, and an IP address of a third-party.

6. The method of claim 3, wherein the indication is included in a trace activation information element (IE) in a trace start message.

7. The method of claim 1, wherein the indication indicates a specific public land mobile network (PLMN).

8. The method of claim 7, wherein the specific PLMN is a PLMN of the hosting operator.

9. The method of claim 7, wherein the indication is included in a MDT configuration IE in a trace activation IE in a trace start message.

10. The method of claim 1, further comprising transmitting an MDT configuration to the UE after receiving the indication.

11. The method of claim 1, further comprising transmitting the trace record to a TCE of the participating operator.

12. The method of claim 1, further comprising transmitting the trace record to a TCE of a third-party.

13. An evolved NodeB (eNB) that is shared by a hosting operator and a participating operator, configured to perform trace recording in a wireless communication system, the eNB comprising:

a radio frequency (RF) unit configured to transmit or receive a radio signal; and a processor coupled to the RF unit, the processor being configured to:

control the RF unit to receive an indication that allows the eNB to collect minimization of drive tests (MDT) logs of a user equipment (UE) of the participating operator from a mobility management entity (MME) of the participating operator;

if the eNB receives the indication, collect both the MDT logs of the UE of the participating operator and MDT logs of a UE of the hosting operator based on the received indication; and control the RF unit to transmit a trace record based on the collected MDT logs to a trace collection entity (TCE) of the hosting operator.

* * * * *